United States Patent

[11] 3,544,707

[72] Inventor James R. Gamble
  Greensburg, Pennsylvania
[21] Appl. No. 797,110
[22] Filed Feb. 6, 1969
[45] Patented Dec. 1, 1970
[73] Assignee Westinghouse Electric Corporation
  Pittsburgh, Pennsylvania
  a corporation of Pennsylvania

[54] COMPOSITE INSULATOR SUPPORTS USING CAST RESINOUS FLANGES AND INSERTS
  8 Claims, 7 Drawing Figs.

[52] U.S. Cl. .................................................. 174/142, 174/152, 174/209
[51] Int. Cl. ...................................................... H01b 17/26
[50] Field of Search ......................................... 174/18, 31, 142, 143, 152, 153, 158, 163, 167, 209

[56] References Cited
UNITED STATES PATENTS
3,001,005 9/1961 Sonnenberg .................. 174/209X
3,011,013 11/1961 Sandkvist ..................... 174/152
FOREIGN PATENTS
941,576 11/1963 Great Britain ................. 174/209
1,020,578 2/1966 Great Britain ................. 174/163

Primary Examiner—Laramie E. Askin
Attorneys—A. T. Stratton, C. L. Mc Hale and W. R. Crout ABSTRACT: A ceramic insulator, such as porcelain, is supported in place having a cast-in-place resinous flange, and in particular an epoxy-resin flange. To prevent the imposition of electrical stress over the surface of the cast resinous flange, in one embodiment, a conducting glaze is provided on the outer surface of the porcelain insulator. In addition, an elastic silicone adhesive layer provides a resilient interface between the porcelain surface and the surrounding resinous flange. To provide the conducting glaze at the same potential as the mounting bolts, preferably a conducting washer is connected by a wire to the conducting glaze so that no voltage stress occurs on the surface of the resinous flange.

In another embodiment of the invention, instead of a silicone adhesive, layers of woven glass tape, or silicone rubber tape, are wound about the outer surface of the insulator, and then the epoxy, or other resin flange is cast in place over the glass tape layers or silicone rubber tape. The glass tape, or rubber tape layers provide the desired ability to withstand thermal cycling throughout the life of the insulator.

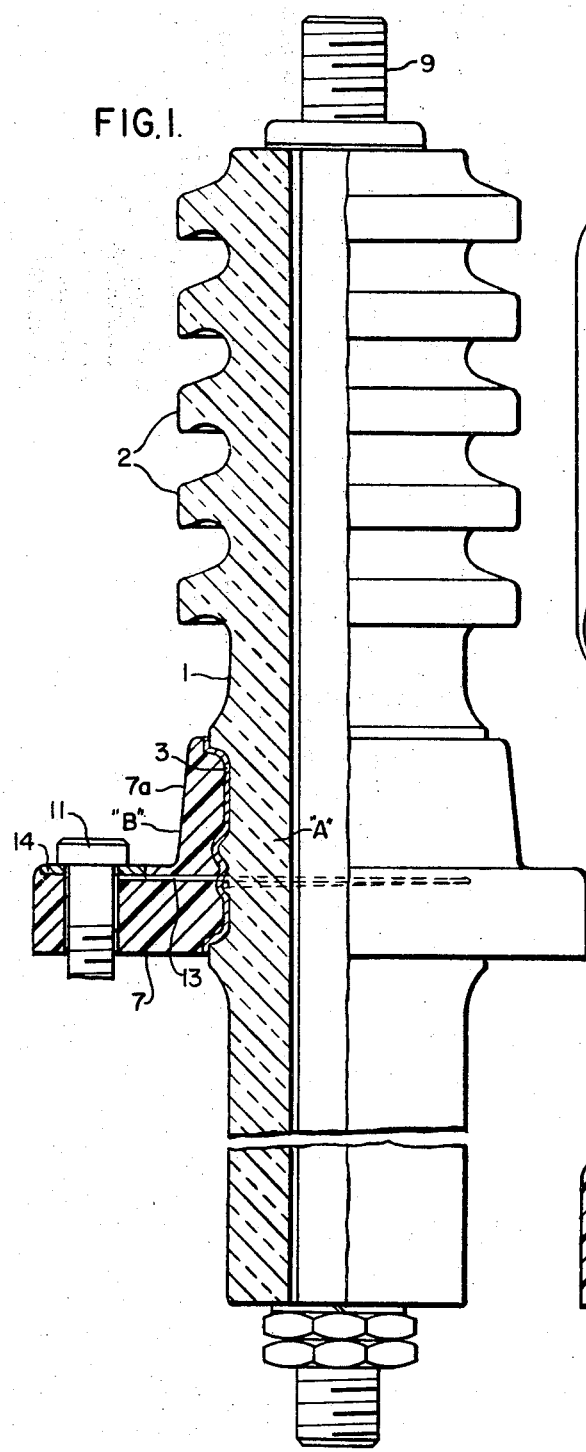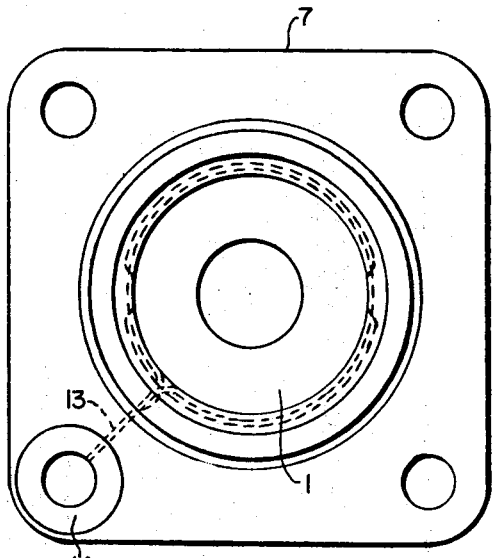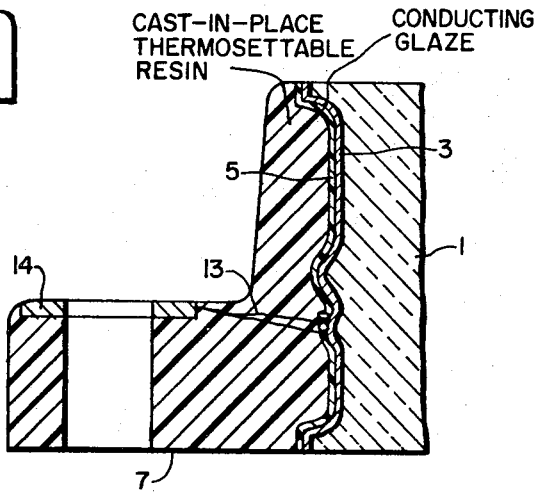

GLASS-WOVEN TAPE

CAST-IN-PLACE RESINOUS FLANGE

SILICONE RUBBER TAPE

COMPOSITE INSULATOR SUPPORTS USING CAST RESINOUS FLANGES AND INSERTS

CROSS-REFERENCES TO RELATED APPLICATIONS

In Pat. application filed Jan. 26, 1965, Ser. No. 433,529, by James R. Gamble, entitled "Joint Constructions", now U. S. Pat. 3,437,554 issued Apr. 8, 1969 and assigned to the assignee of the instant application, there is described an improved joint construction between a ceramic body and a surrounding metallic flange structure secured thereto. In the aforesaid patent application, a permanently tacky resilient cushioning layer of a silicone adhesive is applied to the ceramic body, so as to be interposed between the ceramic body and the contiguous cement poured in the intervening space between the inner ceramic body and the surrounding metallic flange support member.

BACKGROUND OF THE INVENTION

The accepted and usual practice for providing a mounting flange for a porcelain insulator is to use a separate metallic flange attached by means of some type of cement, such as Portland cement, sulphur-base cement, epoxy resins or babbitt. In some cases, an integral porcelain flange is formed as a part of the main insulator body, and the entire insulator is clamped in place with a separate metallic flange. The principal objection to the use of separate metallic flanges, attached with cement, is the high cost of the flange and its attachment to the insulating member.

SUMMARY OF THE INVENTION

In accordance with a preferred embodiment of the present invention, an insulating member, such as a porcelain insulator, is provided with a resilient layer of a silicone adhesive, or with layers of glass-woven tape, or silicone rubber tape, and an outer attaching flange support, in the form of a cast-in-place flange of an epoxy, polyester, or other strong resin, is cast directly over the aforesaid silicone adhesive, or the layers of glass-woven tape, or silicone rubber tape. Epoxy resin will be hereinafter referred to, but other resins may be substituted therefor.

In another preferred embodiment of the invention, to prevent the imposition of electrical stress over the surface of the cast-in-place resinous flange, a conducting glaze is first provided over the outer surface of the porcelain insulator, and this is electrically connected, through a wire-and-washer arrangement, to the mounting bolts, which secure the flange to the grounded tank or other grounded supporting structure.

It is, accordingly, a general object of the present invention to provide an improved insulator support for electrical equipment in which the cost is reduced and, additionally, a certain amount of flexibility, which is permanent in nature, is provided.

Still a further object of the present invention is the provision of a composite insulator having a porcelain, or ceramic body, and a cast-in-place resinous flange, such as a cast epoxy flange, in which an intervening layer of a silicone adhesive, or layers of woven glass tape, or silicone rubber tape, are provided to prevent any cracking when the flange support is thermal-cycled over its operating life. As well known by those skilled in the art, such thermal cycling may extend over a wide temperature range, say, for example, −40 ° C. to +150 ° C. This temperature range must be encountered without any cracking of the flange support.

Still a further object of the present invention is the provision of an improved terminal bushing which provides a low-cost construction, and yet prevents the imposition of electrical stress over the cast-in-place resinous flange during outdoor use.

Another object of the present invention is to provide an improved insulator support with resiliency permanently provided between the insulator body and the surrounding cast-in-place resinous flange.

Further objects and advantages will readily become apparent upon reading the following specification, taken in conjunction with the drawings.

BRIEF DESCRIPTION OF THE DRAWINGS

FIG. 1 is a quarter-sectional view taken longitudinally through an insulator support, in this particular instance constituting a part of a terminal bushing embodying the principles of the present invention;

FIG. 2 is an end elevational view of the insulator support of FIG. 1 with the line stud omitted;

FIG. 3 is a fragmentary enlarged view of the joint between the cast-in-place epoxy flange and the inner porcelain body;

DESCRIPTION OF THE PREFERRED EMBODIMENTS

Figure 4:
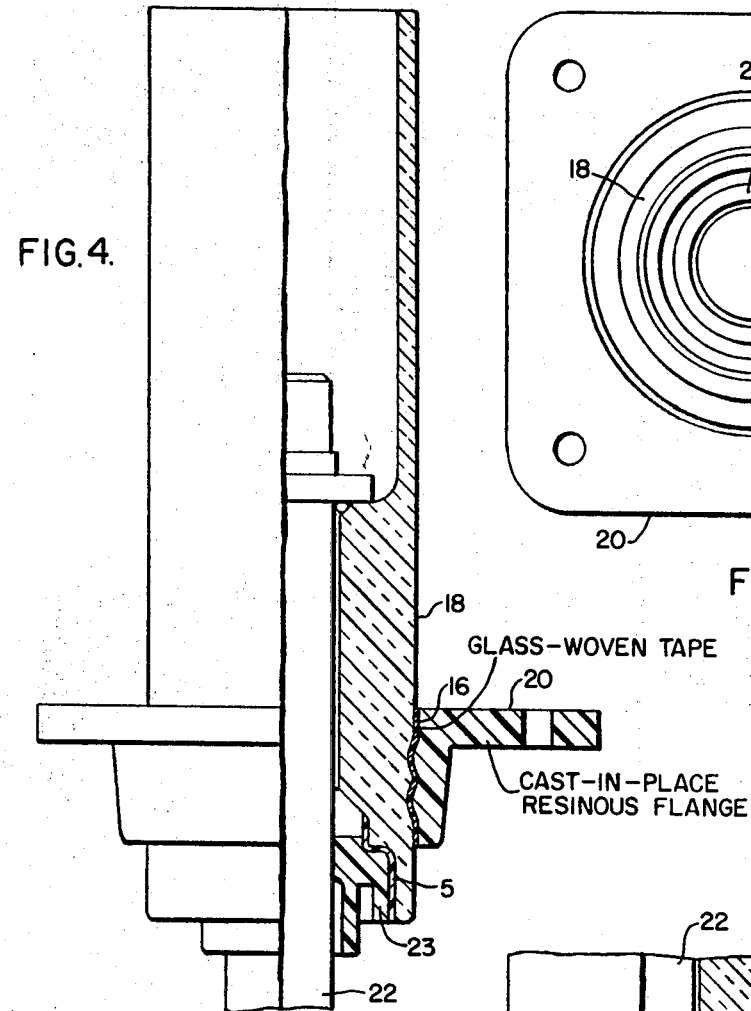
FIG. 4 illustrates a variant type of the invention involving a so-called "bottle" utilized, in metal-clad switchgear, involving a cell structure, also embodying principles of the present invention.

As stated hereinbefore, the accepted and usual practice for providing a mounting flange for a porcelain insulator is to use a separate metallic flange attached by means of some type of cement, such as Portland cement, sulphur-base cement, epoxy resins or babbit. Some of the chemical formulations for such cements are set forth in the aforesaid Gamble Pat. application Ser. No. 433,529, now U.S. Pat. No. 3,437,554

In other cases, an integral porcelain flange is formed as a part of the main insulator body, and the entire insulator is clamped in place with a separate metallic flange. Disadvantages of the foregoing construction are the high cost of the supporting flange and its attachment to the insulating member.

In accordance with the principles of the present invention, the construction cost is considerably reduced by casting in place a flange comprising a thermosettable resinous material, such as an epoxy resin, as more fully described hereinafter. With attention being directed to FIG. 1 of the drawings, it will be noted that there is provided a tubular insulator body 1 having external petticoats 2 provided thereon for increased surface creepage. A conducting glaze 3 is provided on the outer surface of the porcelain body 1, as more clearly shown in FIG. 3, and then a permanently resilient layer 5 is provided about the conducting glaze 3 with an epoxy resin flange 7 cast into place over the insulator 1. The conducting glaze may be applied as per the teachings of the article entitled "Semiconducting Glazes on High-Voltage Insulators" page 740 in May 15, 1964 issue of Electrical Review by C.H.W. Clark.

A stable tacky viscous coating material, suitable for the layer 5, in carrying out this invention is an organopolysiloxane composition comprising from 5 to 70 percent by weight of a benzene soluble resin copolymer of $SiO_2$ units and $R_3SiO_{1/2}$ units, where R is an alkyl radical of less than 4 carbon atoms or a phenyl radical, and where the ratio of $R_3SiO_{1/2}$ units to $SiO_2$ units is from .6:1 to .9:1 inclusive, and 95 to 30 percent by weight of a diorganopolysiloxane having the general formula $R'_2SiO$, where $R'$ is methyl or phenyl and having viscosity of at least 1,000,000 c.p.s. at 25° C.5 and at least 90 percent of the total number of R and $R'$ radicals being alkyl.

Organosiloxane adhesives particularly suitable for use in the practice of the present invention are preferably a mixture of methylsiloxanes, one component being an elastomeric siloxane comprising repeating

units in a chain terminated by (CH₃)3-Si- groups, wherein the ratio of (CH₃) to Si groups is close to 2, but may be either slightly greater than 2, or slightly less, and the other component being a resinous methylsiloxane having from at least 1 to substantially less than 2 methyl groups per silicon atom. From 10 percent to 90 percent by weight of each component may be present in the mixture. The molecular weights are such that a 37 percent solution of the organopolysiloxanes in xylene has a viscosity of 3,000 to 8,000 centipoises at 25° C. Catalysts for curing the mixture of organopolysiloxanes comprise lead carboxyl salts, for example, lead naphthenate, lead acetate and lead propionate, in amounts of from about 0.001 percent to 2 percent. Benzenoid hydrocarbon solvents may be employed to dissolve the organopolysiloxanes for instance benzene, toluene or xylene, to produce solutions of from 30 to 40 percent concentration. A 38 percent to 40 percent solution gives good results.

EXAMPLE

A suitable formulation consists of 50 parts by weight of an organosiloxane copolymer composed of $(CH_3)_3SiO_{1/2}$ units, and $SiO_2$ units having an average of about 1.2 methyl units per silicon atom in the copolymer, 50 parts of a dimethylsiloxane having a viscosity in excess of 10,000,000 c.p.s. at 25° C., having a plasticity of 55, and 2.5 parts of benzoyl peroxide. Lead naphthenate may be substituted for the benzoyl peroxide in this example.

A coating material of this type retains its physical and chemical properties over a wide range of temperatures, and where such ranges are attained in short periods of time and is particularly adapted for use in the present invention.

Other suitable silicone formulations are set forth in U.S. Pat. No. 2,736,721.

A particularly desirable adhesive coating 5 is a silicone adhesive sold by Dow Corning Corporation of Midland, Mich. under the trade name Dow Corning "281" adhesive. This is a pressure-sensitive silicone adhesive, which remains tacky and flexible at service temperature from −80° to over 500°F. It may be described as a xylene dispersion of a complex mixture of elastomeric and resinous organosiloxane polymers in which most of the organic groups attached to silicone are methyl radicals.

As an example of an epoxy-resin system, which has been found to give good results, the following formulation and during procedure may be used:

EXAMPLE 100 parts by weight—Liquid diglycidyl ether of bisphenol A having an epoxy equivalent weight of 180—200 and a viscosity of 10,000—16,000 centipoise at 25° C. commercially available under the proprietary name of Epi-Rez 510 (Jones-Dabney Co.)

80 parts by weight—hexahydrophthalic anhydride.
540 parts by weight—finely divided fused silica.
.2 parts by weight—DMP-10 (Accelerator).

This may be cured 4 hours at 100° C. and another 4 hours at 150° C.

From the foregoing construction, it will be observed that for outdoor use, where there is a potential difference between the internally-extending conducting stud 9, which may be at a high voltage, say at 15Kv and the grounded mounting bolts 11, it is desirable to prevent the imposition of electrical stress over the surface 7a of the epoxy flange 7, because epoxies chalk, erode or track under stress outdoors. Such voltage stress is removed, in accordance with my invention, by wrapping a wire 13 about the glazed conducting layer 3, and securing the wire 13 in conductive fashion to a washer 14, which may be disposed under the head of a mounting bolt 11, such as indicated in FIG. 1. This provides the conducting glaze layer 3 at ground potential, and thereby forces the voltage to be impressed in the region "A" within the porcelain body 1 itself, and not over the surface, indicated by the reference letter "B".

Figure 5:
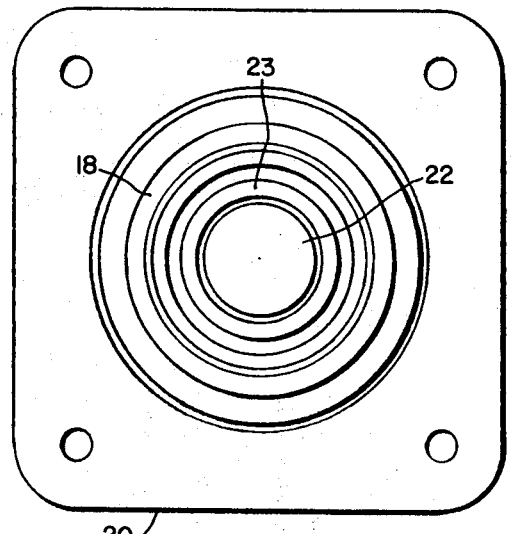
FIG. 5 is an end elevational view of the "bottle" type of insulator support illustrated in FIG. 4.

As an alternate to the use of the silicone adhesive 5, such as the Dow Corning "DC 281" adhesive, resort may be had to layers of glass-woven tape 16, which may be wound around the outer surface of the insulator body 1 at the interface between the body 1 and the surrounding cast-in-place epoxy flange 7. Such a construction is illustrated in FIGS. 4 and 5 of the drawings. With reference to these FIGS. 4 and 5, it will be noted that there is provided a so-called porcelain "bottle" support 18, which is used in connection with the primary disconnecting contacts of metal-clad switchgear equipment. Reference may be had to the following patent for a description of the general type of equipment involved; Finley et al. U.S. Pat. No. 3,213,222, issued Oct. 19, 1965.

It will be observed that again the epoxy flange 20 is cast in place over the surface of the insulator body 18, which has previously been wound with woven glass tape 16. Additionally, to provide further support for the primary disconnecting conducting contact 22, an epoxy plug 23 is cast into place, again there being provided a resilient layer 5, such as silicone adhesive therebetween.

Figure 7:
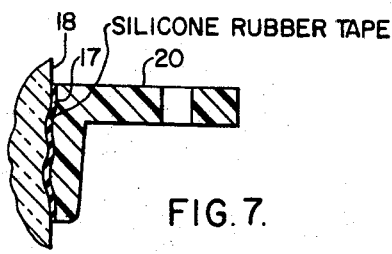

FIG. 7 shows a construction similar to FIG. 4, but silicone rubber tape 17 is used in place of the woven glass tape 16. The flange 20 is then cast into place as before.

Figure 6:
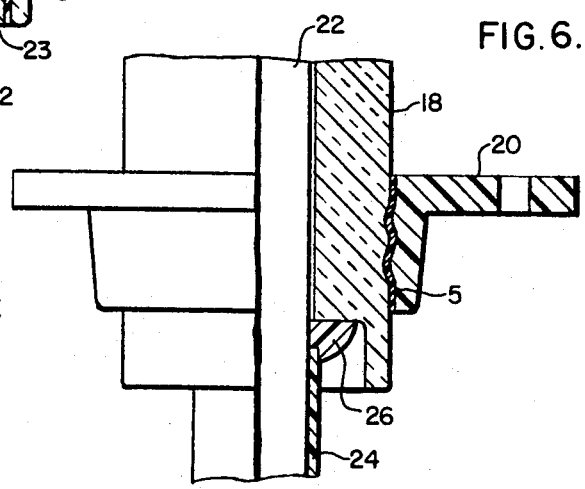
FIG. 6 is a modified type of "bottle" support embodying principles of the present invention; and, FIG. 7 shows a modified construction.

FIG. 6 shows an additional form of the invention, again of the general type of structure, as illustrated in FIGS. 4 and 5, but here, due to its indoor use, there is no necessity for preventing the imposition of electrical stress over the surface of the cast-in-place epoxy flange 20; and here there is merely provided the permanently resilient layer of silicone adhesive, as designed by the reference numeral 5. An insulating tube 24 may surround the stud contact 22. An epoxy-resin plug 26 is cast into place.

From the foregoing description, it will be apparent that there has been provided variant types of porcelain bushings 1, 18 in which the usual outer metallic flange support is eliminated by the cast-in-place epoxy constructions 7, 20 described herein. To prevent electrical stress over the surface of the cast-in-place epoxy flange 7, particularly for outdoor use, a conducting glaze 3 and a washer 14 connection may be employed, as illustrated in FIGS. 1 and 2, or for indoor use, where such voltage stresses may be tolerated, as in the construction of FIG. 6, such conducting glaze may be omitted, and merely the permanently resilient layer 5 of silicone adhesive may be used.

As described herein, in place of the silcone adhesive 5 to provide the ability to resist thermal cycling, layers of woven glass tape 16, or silicone rubber tape 17 may be provided before the casting-in-place epoxy operation 7, 20 is performed.

Any thermosettable castable resinous material having the mechanical strength and electrical strength and thermal and weather stability may be used. Thermosettable epoxy resins are particularly suitable for this purpose; however, polyester resins may also be used. These resinous materials may and will include strengthening fillers in proportion of up to 90 percent of the weight of the cast resin body. Suitable fillers are silica, hydrated alumina, glass fiber, finely divided mica, alumina, and mixtures of two or more of these materials.

Resinous polymeric epoxides or epoxy resins suitable for use in accordance with this invention may be prepared by admixing and reacting from 1- to 2-mol. proportions of epihalohydrin, preferably epichlorohydrin, with about 1-mol. proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed first and then the epichlorohydrin added thereto, or an aqueous solution of alkali and bis-phenol "A" may be added to the epichlorohydrin. In any case, the mixture is heated in the vessel to a temperature within the range of about 80° C. to 110° C. for a period of time varying from about onehalf hour to 3 hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

Examples of suitable catalytic materials include dicyandiamide; triethanolamine; triethanolamine borate; m-phenylenediamine; diphenylamine; melamine; quinoline; hexamethylene tetramine; urea and substituted ureas such as alkyl ureas having from 1 to 5 carbon atoms in each alkyl radical of which there may be from 1 to 4 attached to the nitrogen atoms, for instance, tetraethyl urea; guanidine and substituted guanidines having from 1 to 5 carbon atoms in each alkyl radical of which there may be from 1 to 4 attached to the nitrogen atoms of the amine groups, such as, symmetrical dibutyl guanidine; and acids such as maleic acid, fumaric acid, citraconic acid, phthalic acid and anhydrides thereof, if any.

The catalytic materials may be used singly or in any proper admixture of two or more and are employed in amounts within the range of from 6 percent to 90 percent by weight for each 100 parts of the epoxide.

The epoxy resins are described in more detail in the following U.S. Pat. Nos. 2,444,333; 2,494,295; 2,500,600; 2,511,913 and 2,691,007.

Although there has been illustrated and described specific structures, it is to be clearly understood that the same were merely for the purpose of illustration, and that changes and modifications may readily be made therein by those skilled in the art without departing from the spirit and scope of the invention.

I claim:

1. An insulator support comprising, in combination:
   a. a ceramic body;
   b. a silicone adhesive layer about the external surface of said ceramic body; and
   c. a cast-in-place resinous mounting flange about said silicone adhesive layer.

2. The combination of claim 1, wherein a conducting layer is provided on the surface of the ceramic body and connecting means electrically connects the conducting layer adjacent an outer portion of the flange, whereby voltage stress i prevented from being imposed on the cast-in-place resinous supporting flange.

3. The combination of claim 1, wherein an epoxy resin is used as the casting material.

4. An insulator support comprising, in combination:
   a. a ceramic body;
   b. a plurality of woven-glass tape layers about the external surface of said ceramic body; and
   c. a cast-in-place resinous mounting flange about said glass-woven tape layers.

5. The combination according to claim 4, wherein a conducting layer is provided adjacent the outer surface of the ceramic body, mounting bolts pass through the flange, and grounded connecting means connects the conducting layer to one of the mounting bolts.

6. The combination of claim 4, wherein an epoxy resin is used as the casting material.

7. An insulator support comprising, in combination:
   a. a ceramic body;
   b. a plurality of silicone rubber tape layers about the external surface of the ceramic body; and
   c. a cast-in-place resinous mounting flange about the silicone rubber tape layers.

8. The combination of claim 7, wherein an epoxy resin is used as the casting material.